(12) United States Patent
Cappiello

(10) Patent No.: US 6,410,863 B1
(45) Date of Patent: Jun. 25, 2002

(54) ELECTRONIC SCALE HAVING ANALOG DISPLAY

(75) Inventor: Mark Cappiello, New York, NY (US)

(73) Assignee: Measurement Specialties, Inc.

( * ) Notice: Subject to any disclaimer, the term of this patent is extended or adjusted under 35 U.S.C. 154(b) by 0 days.

(21) Appl. No.: 09/360,331

(22) Filed: Jul. 23, 1999

(51) Int. Cl.$^7$ .......................... G01G 19/34; G01G 23/14
(52) U.S. Cl. ...................... 177/25.13; 177/33; 177/166; 177/167; 177/177; 177/173; 116/284; 116/286; 116/288; 116/300
(58) Field of Search .......................... 177/25.11, 25.12, 177/25.13, 25.15, 177, 33, 166, 167, 173, 174, 256; 116/284, 286, 287, 288, 300; 377/112, 113

(56) References Cited

U.S. PATENT DOCUMENTS

| | | | |
|---|---|---|---|
| 545,110 A | * 8/1895 | Swift | 177/33 |
| 2,688,878 A | * 9/1954 | Kolisch | 177/25.11 |
| 2,689,082 A | * 9/1954 | Kolisch | 177/25.11 |
| 2,727,391 A | * 12/1955 | Kolisch | 177/25.11 |
| 2,812,904 A | * 11/1957 | Kolisch | 177/25.11 |
| 3,460,642 A | 8/1969 | Provi et al. | 177/256 |
| 3,478,618 A | 11/1969 | Provi et al. | 177/257 |
| 3,655,003 A | * 4/1972 | Yamajima | 177/177 |
| 3,666,031 A | 5/1972 | Provi et al. | 177/186 |
| 3,927,726 A | * 12/1975 | Hanado et al. | 177/213 |
| 4,041,782 A | * 8/1977 | Hingst | 116/116 |
| 4,047,006 A | * 9/1977 | Ellner | 177/25.13 |
| 4,051,913 A | * 10/1977 | Gudea | 177/25.13 |
| 4,155,413 A | * 5/1979 | Angst | 177/178 |
| 4,176,546 A | * 12/1979 | Gibson et al. | 116/300 |
| 4,177,868 A | * 12/1979 | Sanders et al. | 177/211 |
| 4,258,812 A | * 3/1981 | Pfeiffer | 177/210 R |
| 4,314,146 A | 2/1982 | Berney | 235/92 EA |
| 4,366,873 A | * 1/1983 | Levy et al. | 177/45 |
| 4,387,360 A | 6/1983 | Jordan et al. | 340/27 AT |
| 4,436,435 A | * 3/1984 | Ushikoshi | 368/71 |
| 4,462,473 A | * 7/1984 | Valestin | 177/25.13 |
| 4,542,799 A | * 9/1985 | Komoto | 177/177 |
| 4,572,309 A | 2/1986 | Nishiyama | 177/50 |
| 4,591,011 A | * 5/1986 | Baumann | 177/177 |
| 4,609,954 A | 9/1986 | Bolton et al. | 360/78 |
| 4,650,014 A | * 3/1987 | Oldendorf et al. | 177/177 |
| 4,704,984 A | 11/1987 | Mayer | 116/287 |
| 4,819,750 A | * 4/1989 | Carnevale | 177/256 |
| 4,825,966 A | * 5/1989 | Langford et al. | 177/177 |
| 4,893,685 A | 1/1990 | Bergman et al. | 177/173 |
| 4,907,179 A | * 3/1990 | Oldendorf et al. | 177/25.13 |
| 5,141,065 A | * 8/1992 | Maxwell et al. | 177/210 R |
| 5,172,349 A | 12/1992 | Triponez et al. | 368/157 |
| 5,220,541 A | 6/1993 | Vuilleumier | 368/88 |
| 5,237,123 A | 8/1993 | Miller | 84/21 |
| 5,406,303 A | * 4/1995 | Salmon et al. | 345/75 |
| 5,473,580 A | 12/1995 | Gilomen et al. | 368/28 |
| 5,592,037 A | 1/1997 | Sickafus | 310/40 MM |
| 5,798,625 A | 8/1998 | Tanii et al. | 318/541 |

\* cited by examiner

Primary Examiner—Randy W. Gibson
(74) Attorney, Agent, or Firm—Duane Morris LLP

(57) ABSTRACT

An apparatus which measures the body weight of an individual, comprising a platform for supporting the individual to be weighed; a plurality of sensors disposed within the platform for sensing a force exerted on the platform indicative of the weight of the individual and generating an analog signal proportional to the sensed force; electronic means for combining the analog signals from the plurality of sensors to form a combined electronic signal indicative of the weight of the individual; a processor for generating a digital signal based on the electronic signal for driving an electro mechanical actuator for displaying the measured body weight on a display device, the display device comprising a graduated dial having at least one concentrically arranged scale and a rotatable pointer, the pointer driven in rotation by the actuator according to the processor to a position on the graduated dial which corresponds to the measured body weight of the individual.

17 Claims, 12 Drawing Sheets

ELECTRONIC SCALE HAVING ANALOG DISPLAY

FIELD OF INVENTION

The present invention relates to measurement devices in general and more particularly to an electronic scale having an analog display for displaying a measured weight.

BACKGROUND OF THE INVENTION

The concept of electro mechanical read out for instrumentation has a long history in automotive horology, aviation, metrology and the like. For instance, U.S. Pat. No. 4, 704,984 issued to Mayer on Nov. 10, 1987 and entitled "DISPLAY DEVICE" discloses a display device for displaying two measured values on a graduated dial having scales arranged concentrically to each other and turnable pointers for indicating the value of the particular measurement.

U.S. Pat. No. 4,387,360 entitled "GLIDE PATH SYSTEM FOR USE WITH AIRCRAFT ALTIMETERS" issued to Jourdan et al. on Jun. 7, 1983 discloses a system for providing an indication of a glide path for aircraft using a conventional altimeter having a graduated dial scale and a rotatable pointer which is controlled by an on-board computer to provide a time dependent moving indication of a descent rate on the dial scale which corresponds to a safe theoretical glide path.

Another patent entitled "CHRONOGRAPH WATCH WITH DATE INDICATOR" issued to Gilomen et al. on Dec. 5, 1995 (U.S. Pat. No. 5,473,580) discloses a chronograph watch having a plurality of indicators for displaying the time of day in hours, minutes, and seconds as well as displaying particular time intervals in response to a controlling unit.

Prior art weight scales have used utilized rotating number dials and pointers associated with fixed indicia for displaying weight data to a user. However, such scales, as disclosed in U.S. Pat. Nos. 4,893,685, 3.666.031, 3,478,618 and 3,460,642, utilize mechanical sensing mechanisms, levers, springs and multiple moving parts as part of their design. Scales which are in widespread use today typically utilize electronic means to provide a digital readout of the associated user weight. Current scales also employ sensing devices such as transducer load cell assemblies or piezoelectric sensors for measuring the weight, an analog to digital converter for converting the sensed signal into digital format, and a microcomputer for receiving the A/D converted data and displaying the digital representation onto a digital display, such as an LCD display. An example of such a device is provided in U.S. Pat. No. 4,572,309 issued to Nishiyama on Feb. 25, 1986 and U.S. Patent No. entitled "ELECTRICAL WEIGHING SCALE" issued to Germanton et al. and incorporated herein by reference.

However, none of the aforementioned apparatus utilize a sensor device which provides weight signal data to a digital processor for driving an electro mechanical actuator to produce an analog readout of body weight to a user.

SUMMARY OF THE INVENTION

A weighing apparatus comprising a platform for receiving a body to be weighted; at least one sensor coupled to the platform for sensing a force associated with the body and generating an analog signal indicative of the sensed force; a digital processor including analog to digital conversion means responsive to the analog signal for outputting a digital control signal; an actuator having an input for receiving the digital control signal for driving the actuator; and an analog display for displaying body weight based on the sensed force, the analog display comprising a dial having indicia thereon, and a moveable display member driven by the actuator to a position associated with particular indicia on the dial which represents the sensed force.

An apparatus which measures the body weight of an individual, comprising a platform for supporting the individual to be weighed; a plurality of sensors disposed within the platform for sensing a force exerted on the platform indicative of the weight of the individual and generating an analog signal proportional to the sensed force; electronic means for combining the analog signals from the plurality of sensors to form a combined electronic signal indicative of the weight of the individual; a microprocessor for generating a digital signal based on the electronic signal for driving an electro mechanical actuator for displaying the measured body weight on a display device, the display device comprising a graduated dial having at least one concentrically arranged scale and a rotatable pointer, the pointer driven in rotation by the actuator according to the processor to a position on the graduated dial which corresponds to the measured body weight of the individual.

DETAILED DESCRIPTION OF THE PREFERRED EMBODIMENT

Before embarking on a detailed discussion, the following should be understood. The basic concept disclosed herein is an electronic scale which utilizes conventional load cell or sensor measurement apparatus and is interfaced to conventional analog electronics (such as calibration and combining circuitry) and digital circuitry such as a microprocessor. The scale according to the present invention is provided with a read out in the form of an analog instrument cluster or chronograph dial with analog hands or pointers that respond to electronic signals produced by the digital electronics and microprocessor unit and which drives a mechanical actuator in response to the signal output of the sensor.

Figure 1:
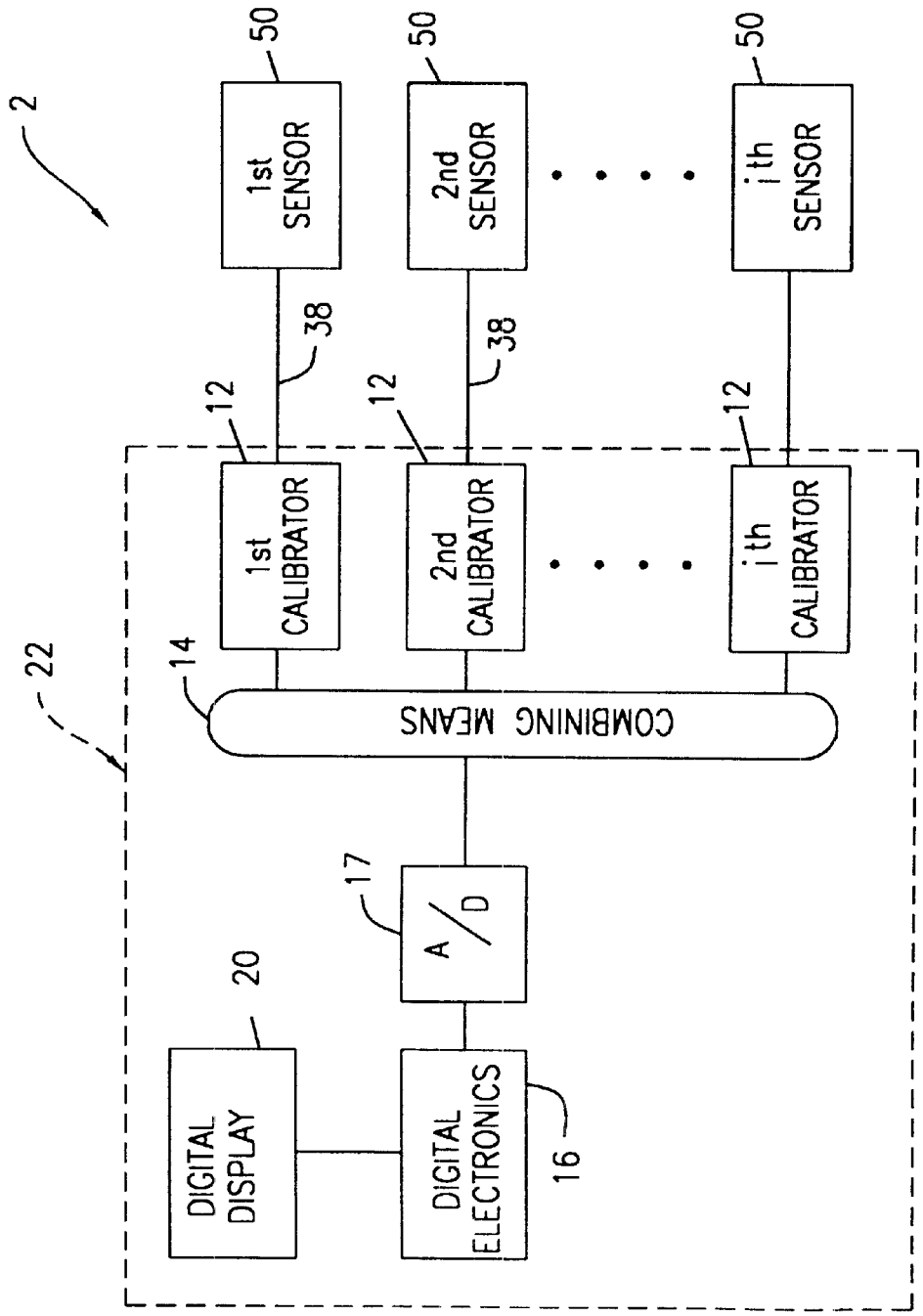
FIG. 1 is an exemplary block diagram of a prior art electronic weight scale.

Referring now to FIG. 1, there is shown a prior art electronic weighing scale which utilizes analog and digital circuitry to provide a digital display readout to a user. As shown in FIG. 1 (and as disclosed in the Germanton et al. patent) sensors 50 within the weighing scale operate to sense an applied weight onto the scale platform and generate a signal 38 proportional to the sensed weight. Analog electronic circuitry such as conventional calibration circuit 12 and combining electronic network circuitry 14 operate to provide a total weight value to digital electronics module 16 via an analog to digital converter 17. Digital electronics module 16 includes digital display drivers and conventional digital circuitry which provides appropriate current and voltage levels to digital display device 20 such as an LCD or LED display.

Figure 2:
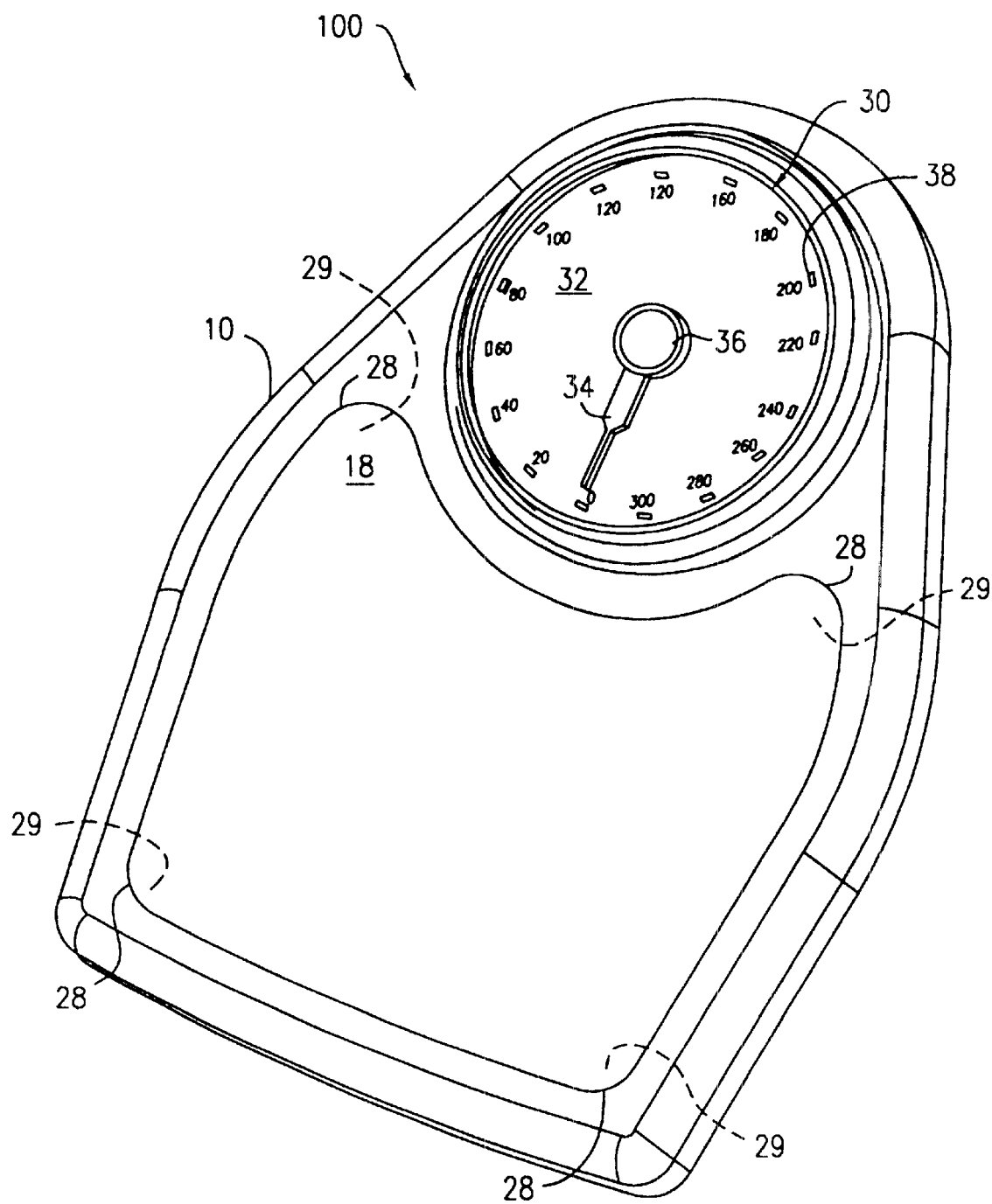
FIG. 2 illustrates a perspective view of an electronic weighing scale having digital electronics circuitry for driving an analog display according to an embodiment of the present invention.
Figure 3:
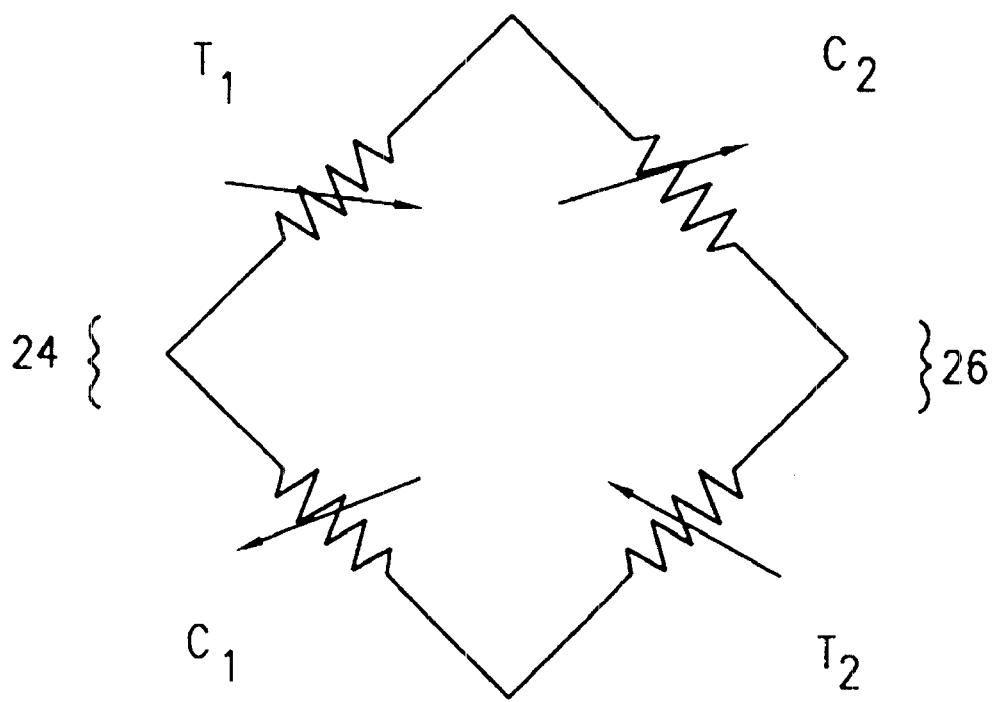
FIG. 3 is an exemplary illustration of a sensor system of strain gauges intercoupled in a bridge configuration.

Referring now to FIG. 2, there is shown a first embodiment of an electronic weighing scale 100 having digital electronics circuitry for driving an analog display according to the present invention. Scale 100 includes a platform 18 which is elevated by supports 29 at positions 28 corresponding to the perimeter portions of the platform 18. Platform 18 represents the top surface of housing 10 which contains all of the analog and digital electronic circuitry and sensor devices for scale 100. Each support comprises a load cell which contains a sensor plate with strain gauges in conventional fashion. The strain gauges are typically intercoupled in a conventional bridge configuration as shown in FIG. 3, wherein one leg 24 includes strain gauges T1 and C1 in tension and compression respectively, while leg 26 includes strain gauges C2 and T2 in compression and tension respectively, under load conditions. The load cell assembly sensors 29 operate to sense a force resulting from a body standing on platform 18 and generates an analog signal indicative of the sensed force and hence, the sensed body weight.

Figure 5:
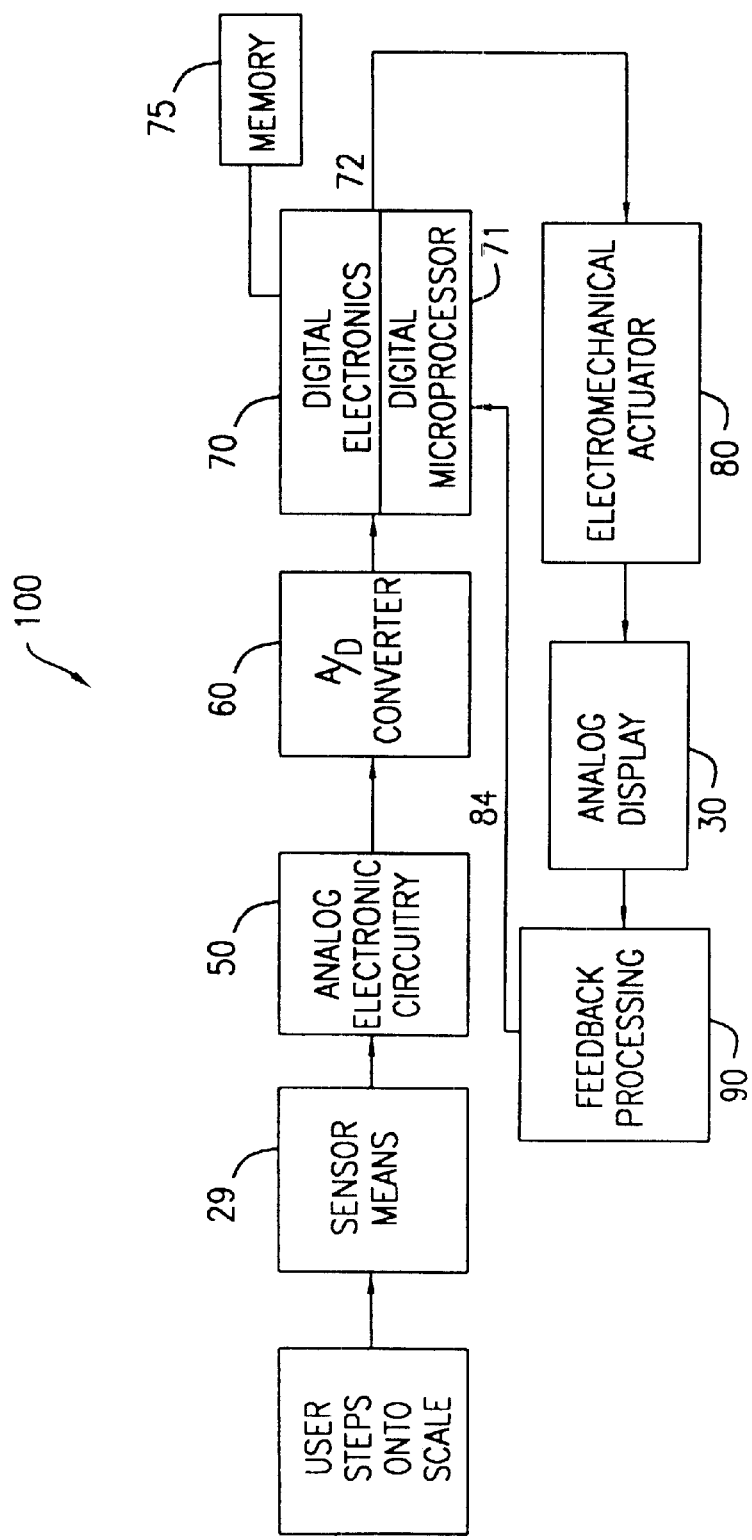
FIG. 5 is an exemplary block diagram of the major functional components of the scale apparatus shown in FIG. 2 according to the present invention.

Referring to FIG. 5 in conjunction with FIG. 2, the analog signal is input into conventional analog electronic circuitry (reference numeral 50 of FIG. 5) for signal calibration, amplification, and processing including performing reference voltage and test voltage generation, zero point setting, and the like for conditioning the sensed analog signal. Such analog electronic circuitry is well known and will not be described herein further. Reference may be made to prior art FIG. 1 and to U.S. Pat. No. 4,572,309 for a discussion of the type of analog circuitry utilized in processing sensor signal data. The processed analog signal is output from analog electronics module 50 for input into analog to digital converter 60 for converting into a digital format.

Analog display 30, as shown in FIG. 2, comprises a dial 32 on which is formed a display member 34 comprising a rotatable pointer rotatable around a shaft 36 about dial 32. The dial includes indicia 38 formed thereon which corresponds to scaled weight units. Indicia are concentrically aligned about the dial at equally spaced intervals. As shown in the embodiment of FIG. 2, the scaled weight units are numerically labeled in increments of 20 pounds, and have graduations at 1 pound intervals.

Digital circuitry (reference numeral 70 in FIG. 5) including a microprocessor unit is contained within housing 10 of scale 100 and operates in response to Analog/Digital (A/D) converter 60 which provides digitized sensor input data from load cell sensors 29 for generating a digital signal 72 input to an actuating device (reference numeral 80 in FIG. 5). Digital processor 70 may be in the form of a microcomputer having a microprocessor 71 and memory 75 for storing data as well as software programs for determining and storing the measured weight values. Such memory may include EEPROM for storing and updating software programs as well as RAM and ROM memory. Digital electronics module 70 includes in addition to the microprocessor, digital counters, registers, and other conventional digital apparatus for determining the weight of the body and tracking the position of the pointer member about the face of the dial. The microprocessor then operates to provide, based on the weight measurement to be output, the digital control signal 72 for driving electro mechanical actuator 80 which is coupled to the analog display for driving the display output. Several forms of electro mechanical actuators are contemplated including a simple DC motor with servo feedback, a stepper motor/controller, or a solenoid. Actuator 80 may include a DC motor located within the housing beneath analog display 30 and rotatably coupled to pointer shaft 36 for driving pointer 34 to the appropriate position corresponding to the weight of the user. Preferably, the DC motor is reversible and may be used in conjunction with a feedback mechanism (reference numeral 90 in FIG. 5)for accurately positioning the pointer to the determined weight.

Figure 6A:
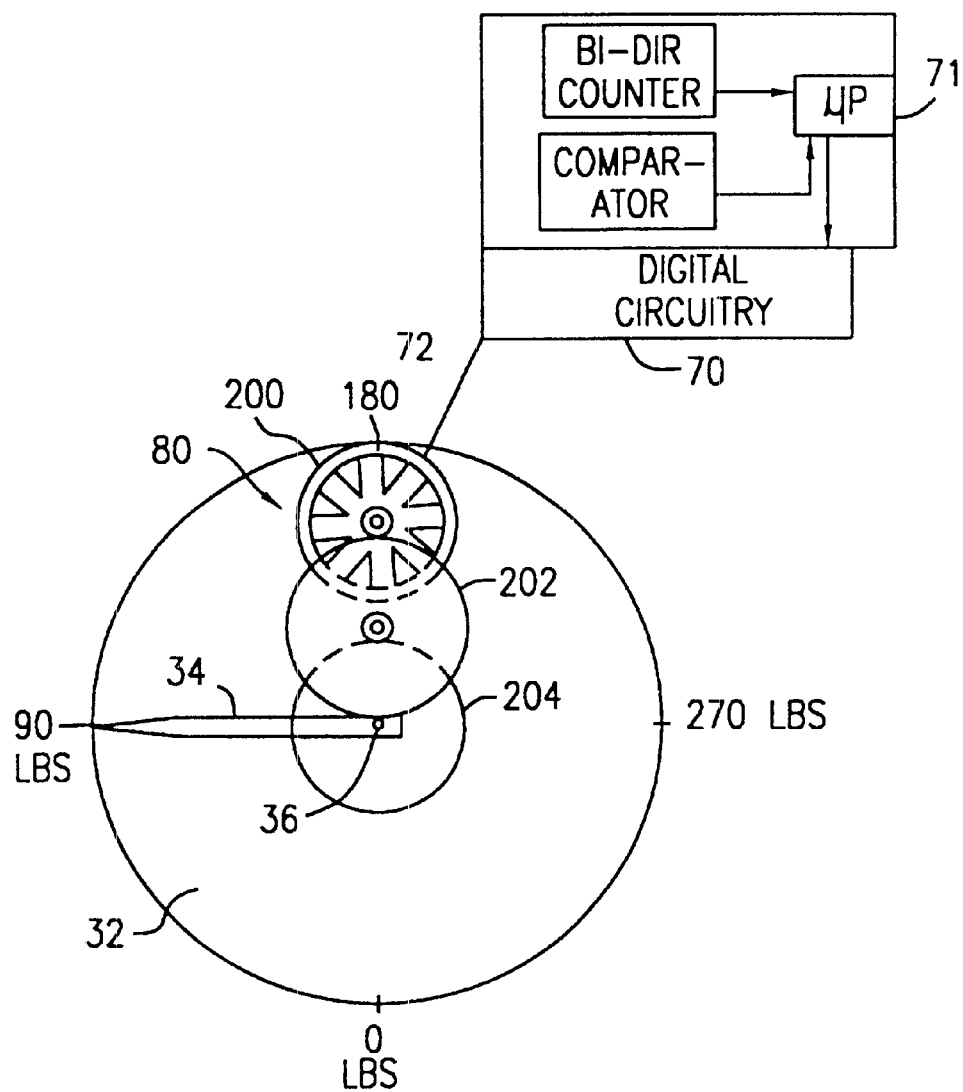
FIG. 6A is an exemplary schematic illustration of an electro mechanical actuator activated by the digital electronics for driving an analog display according to an embodiment of the invention.

FIG. 6A provides an exemplary schematic diagram illustrating actuator 80 comprising a stepper motor for rotating the pointer member to the appropriate position based on the digital control signal 72 from the digital microprocessor unit 71. As shown in FIG. 6A, bi-directional stepping motor 200 responds to control signal 72 from digital electronic circuitry 70 and drives through a wheel 202, wheel 204. Wheel 204 supports on its axis at hub 36, pointer 34 which cooperates with the graduated dial 32 to indicate the appropriate weight measurement of the individual. As one can ascertain, the gear ratios and data corresponding to the relative motion of the actuator versus movement of the pointer member is predetermined and may be stored in computer memory for use by the microprocessor. Note that the actuator 80 is located beneath dial 32.

Figure 6B:
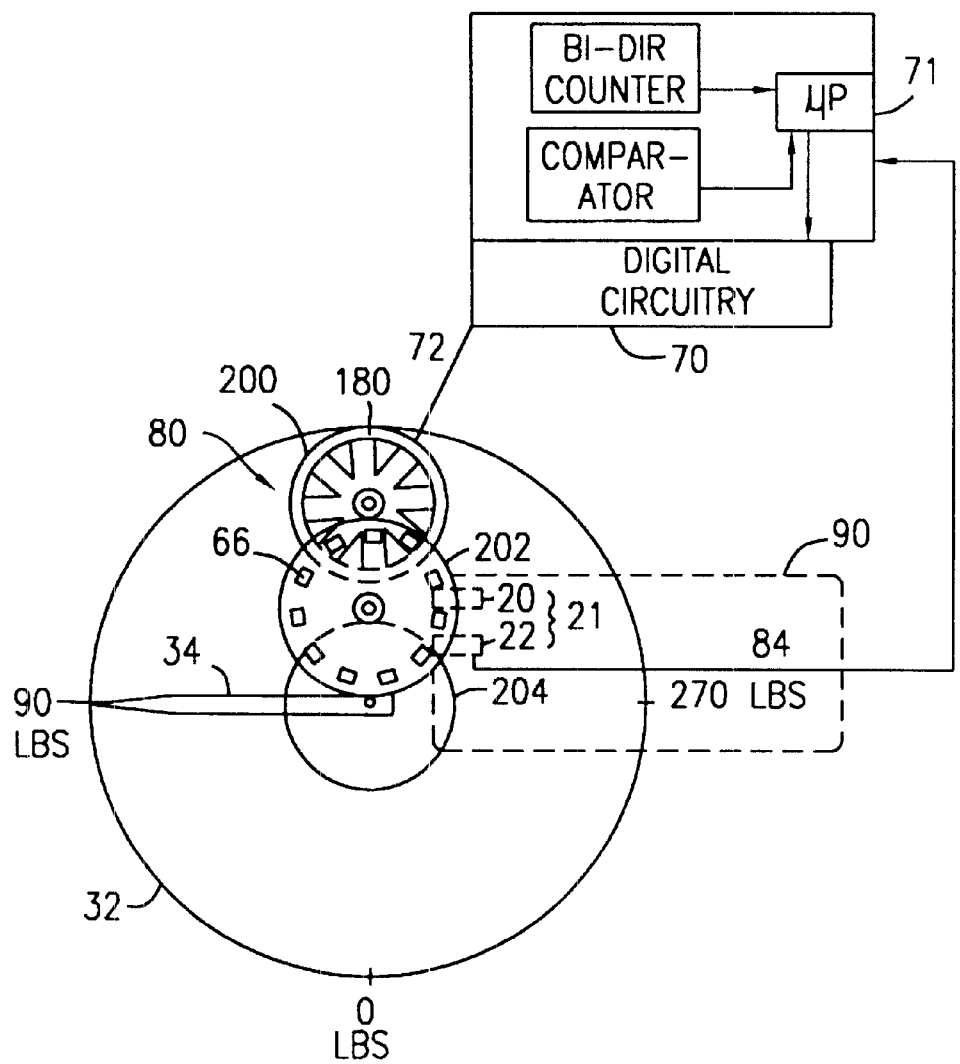
FIG. 6B is an exemplary illustration of a feedback system for providing feedback to the digital electronics circuitry for determining the position of a pointer member associated with the analog display according to an embodiment of the invention.

As shown in FIG. 6B, an optical sensor system 21 may be employed as the feedback means 90 for determining the position of the rotary drive of the DC motor 200. In a particular embodiment, timing wheel 202 may include equidistant spaced holes or apertures 66 positioned at the outer edge of the wheel which is interposed between a light emitting diode 20 and a photo diode 22. Both the diode 20 and photo diode 22 may be mounted in a sensor block within the housing 10 that is attached to a support block which supports DC motor 200 in conventional fashion. As the wheels 202, 204 of the gear train turn in response to rotation by the shaft of motor 200, the corresponding equidistant spaced holes 66 at the outer edge of the wheel 202 pass through a light beam from LED 20 to detector 22 for feedback position sensing. The optical sensor 21 via detector 22 provides the microprocessor unit 70 with digital pulses 84 that are directly proportioned to the angular position of the great wheel and hence, pointer position. This permits the digital electronics to accurately terminate or adjust actuation of the motor to provide accurate pointer position.

Figure 7:
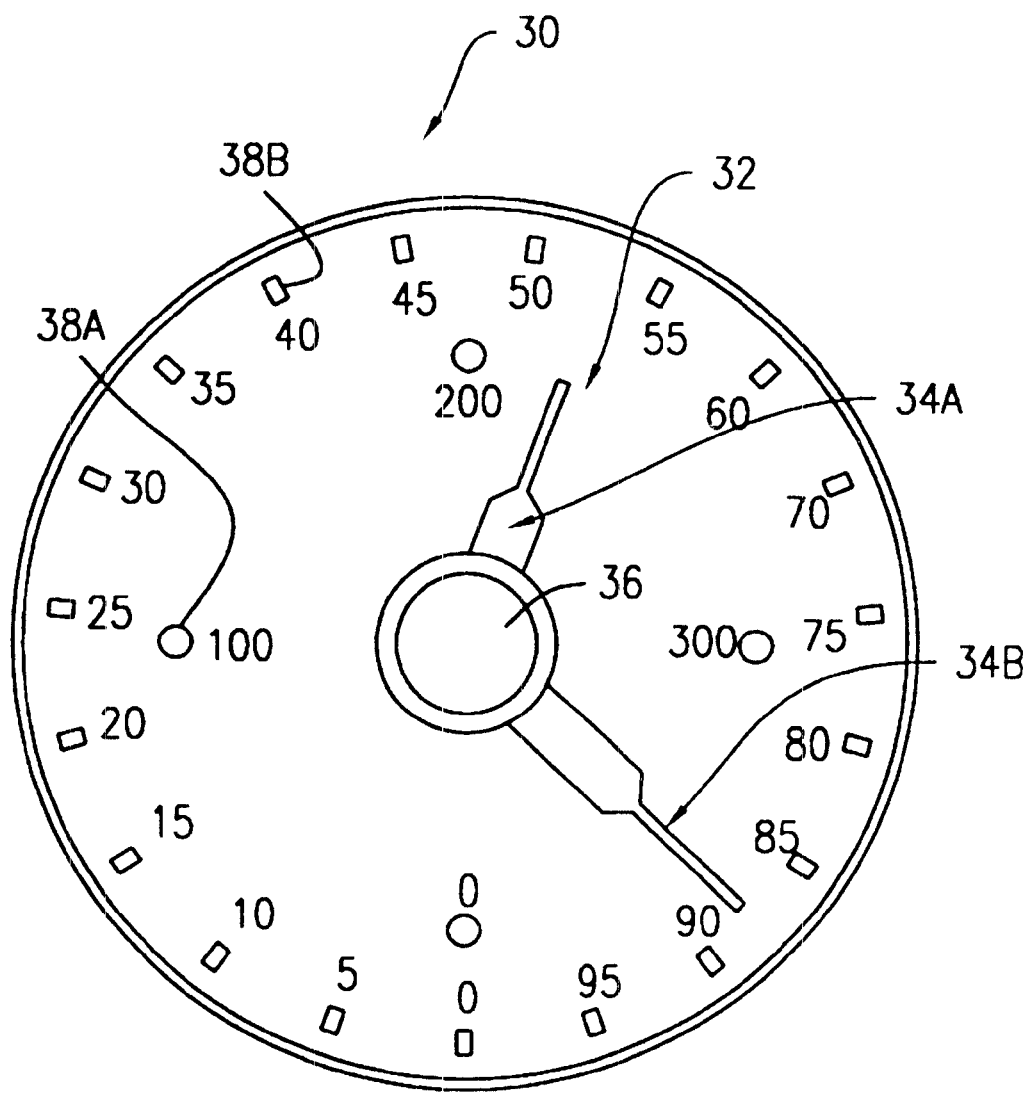
FIG. 7 provides an exemplary schematic illustration of an analog display according to an alternative embodiment of the invention.

FIG. 7 shows another alternative embodiment analog display 30 according to the present invention which incorporates a stepping motor driven by a digital control signal from the microprocessor (see FIGS. 6A, 6B) within the digital electronics module 70 through a wheel which supports on its axis a pair of pointers 34A, 34B which, in combination, operate to display the weight of the user. A pair of concentric scales are spatially arranged on the dial radially from each other so that each one of the two scales corresponds to a respective pointer member. Each of the pointer members are turnable around a corresponding pointer shaft. The pointer which is pointer 34A is shorter than corresponding pointer 34B and coincides with radially spaced scale 38A. Pointer 34B corresponds to radially spaced scale 38B. Both of the pointers are disposed on top of the dial 32. In a preferred embodiment, the control signal from the microprocessor operates to activate a DC motor to cause rotation of the corresponding pointers to point to the corresponding weight of the user. The rotation of the wheels driving the pointers are such that a linear relationship exists between the rotation of the two pointers to enable the correct display of the weight measurement. The pointers are turnable at different rates around the dial and correspond to first coarse (i.e. 38A) and second precision (i.e. 38B) indicia concentrically arranged around the dial such that the combination of the first indicia pointed to by the first pointer and the second indicia pointed to by the second pointer represent the weight of the body. Alternatively, a pair of motors, each coupled to a corresponding pointer for actuating that pointer, may be utilized to produce the same result. A separate control signal from the microprocessor may then be used to initiate and control the corresponding actuating motors. In an alternative embodiment, multiple legends each standing for a distinct unit of measurement can be included on the dial for simultaneous display (ie. Markings for Lb. and Kg).

Figure 4:
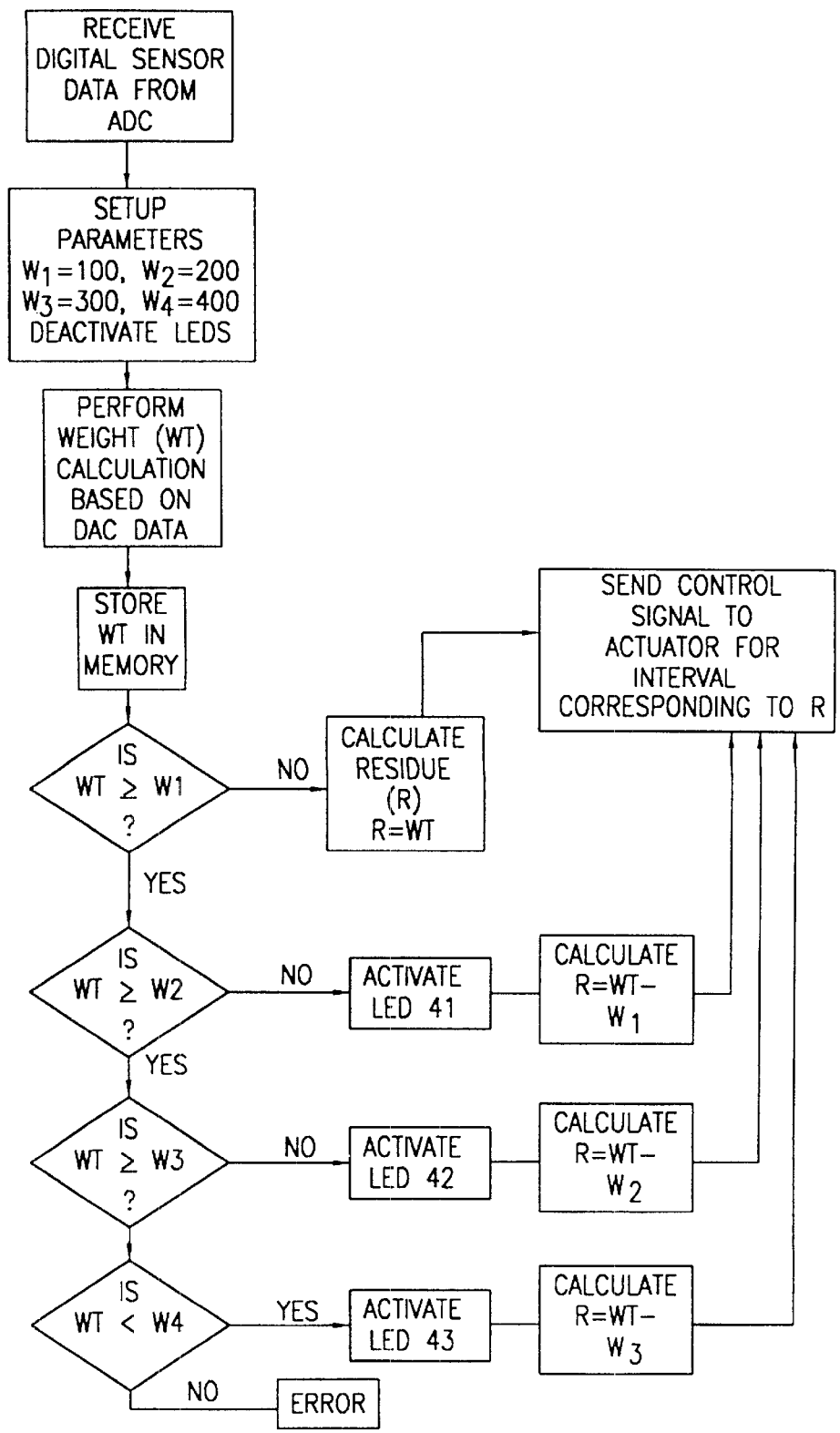
FIG. 4 is an exemplary flow diagram for controlling the analog display including LED activation via the digital electronics according to an embodiment of the invention depicted in FIG. 8A–8B.
Figure 8A:
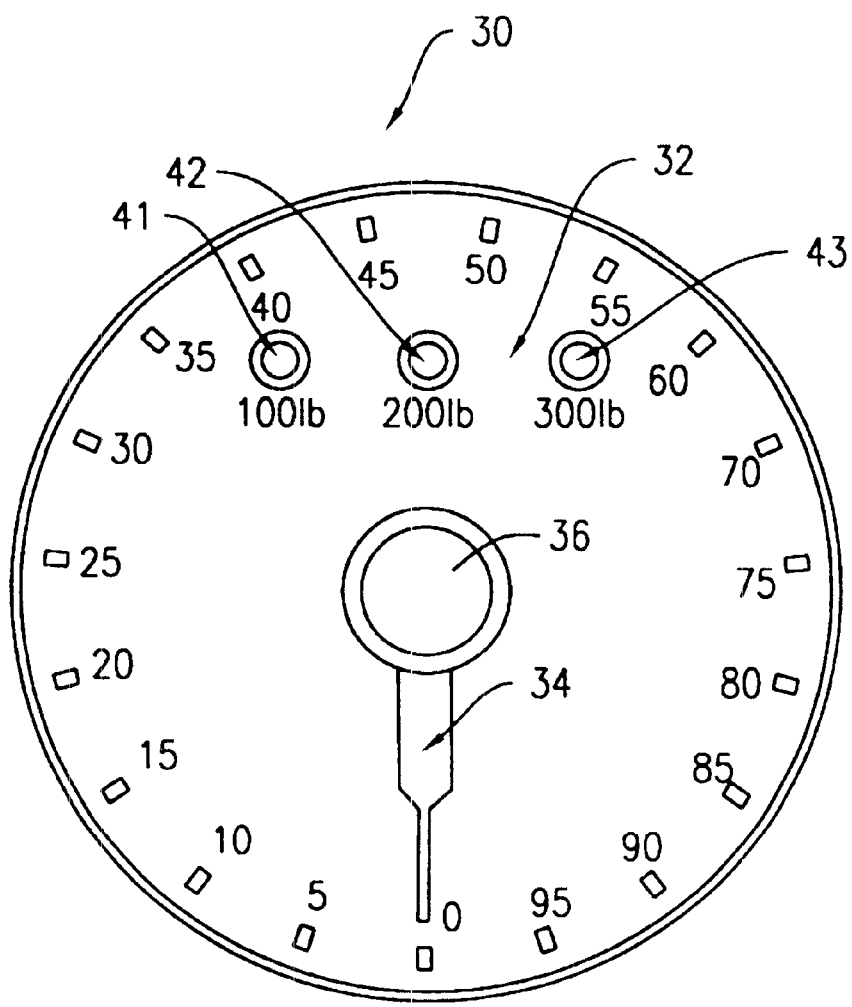
FIG. 8A provides an exemplary schematic illustration of an analog display according to still another embodiment of the invention.
Figure 8B:
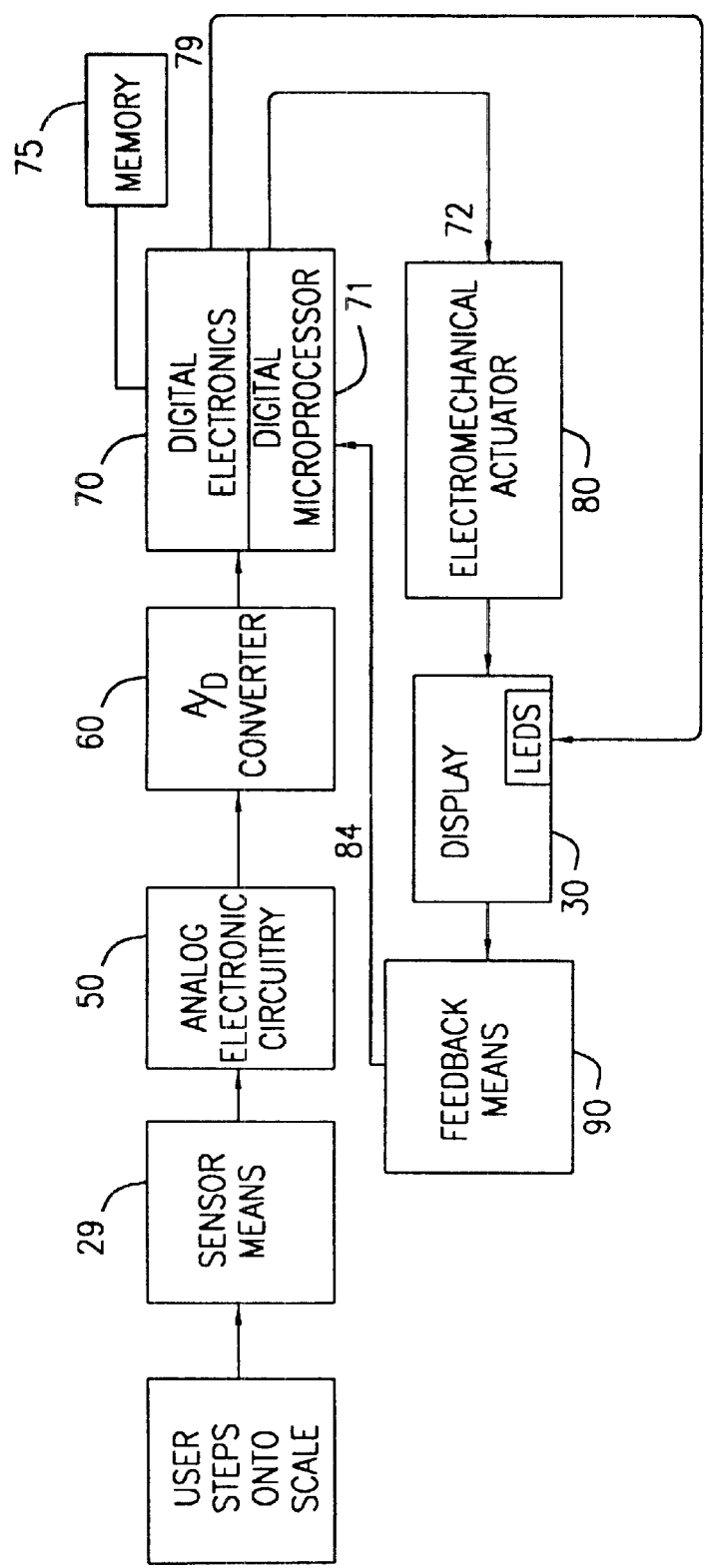
FIG. 8B is an exemplary block diagram of the major functional components of the scale apparatus associated with FIG. 8A.

In an alternative embodiment shown in FIGS. 8A–8B, the analog display may include illuminating indicator means comprising a series of light emitting devices such as LEDs, each corresponding to a weight unit. FIG. 8A depicts the analog display 30 while FIG. 8B illustrates the associated block diagram processing. For instance, FIG. 8A depicts LED 41 as corresponding to a weight unit parameter of 100 pounds; LED 42 corresponds to 200 pounds; and LED 43 corresponds to 300 pounds weight unit value. In this embodiment, as shown in FIG. 9B, the microprocessor in digital electronics module 70 also operates to provide a second digital control signal 79 utilizing conventional digital display driver circuitry to activate a corresponding one of LEDs 41, 42 or 43 so that the combination of the LEDs and the value pointed to by pointer 34 represent the measured weight of the individual. The digital microprocessor includes conventional circuitry for obtaining and storing the measured weight value and for both activating the appropriate LED and calculating the appropriate position of rotatable pointer 34 about dial 32 (FIG. 8A). The microprocessor may also include software algorithms or programs for calculating and tracking the values displayed via analog display 30. An exemplary software program for controlling analog display 30 including LED activation via the microprocessor is shown in FIG. 4. As shown in FIG. 4, digital data from A/D converter 60 is received by the microprocessor and initialization and setup processing for calculating and displaying weight parameter data commences. A weight determination is then made and, based on that calculated value, one (or none) of the corresponding LEDs 41,42,43 corresponding to the coarse weight unit (i.e. 100, 200, or 300 pounds) is activated. The residual value R is then calculated by subtracting the weight from the corresponding coarse parameter (w1, w2, w3) and control signal 72 is output to actuator 80 to drive the pointer member to the appropriate position corresponding to the calculated R value.

Figure 9A:
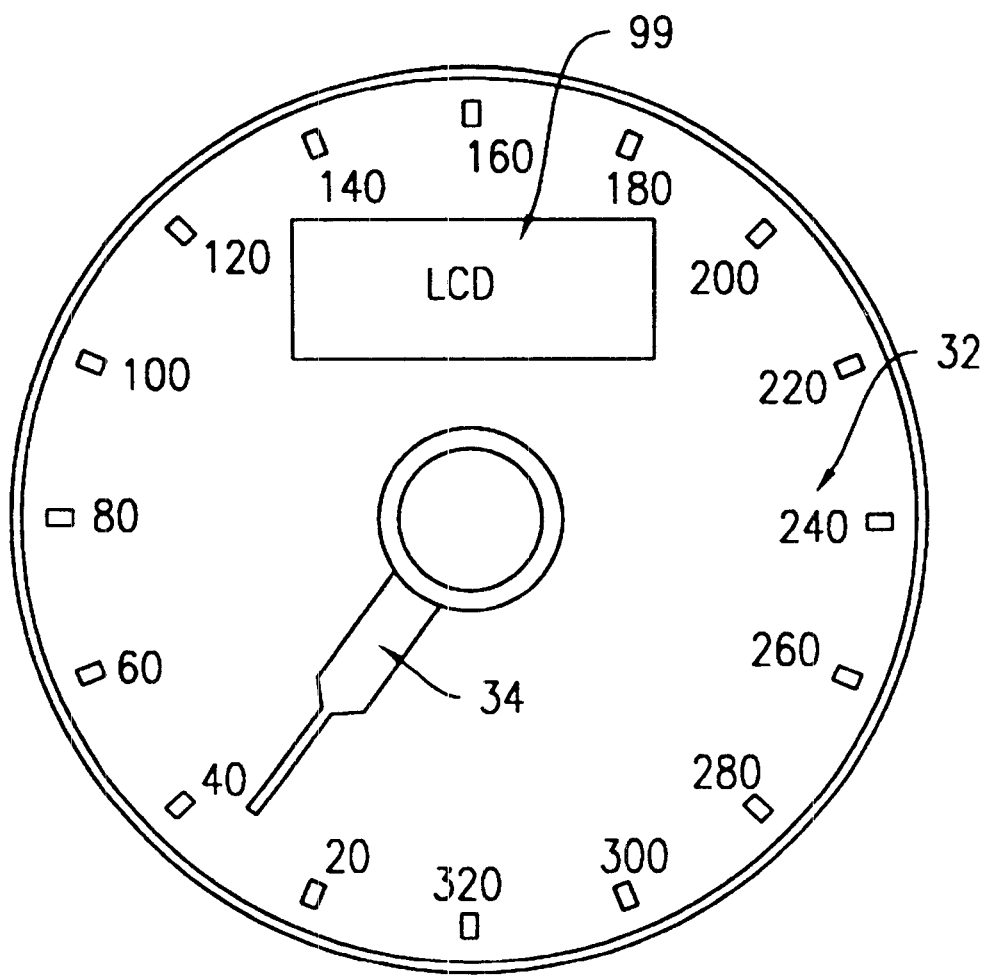
FIG. 9A provides an exemplary schematic illustration of an analog display according to still another embodiment of the invention.
Figure 9B:
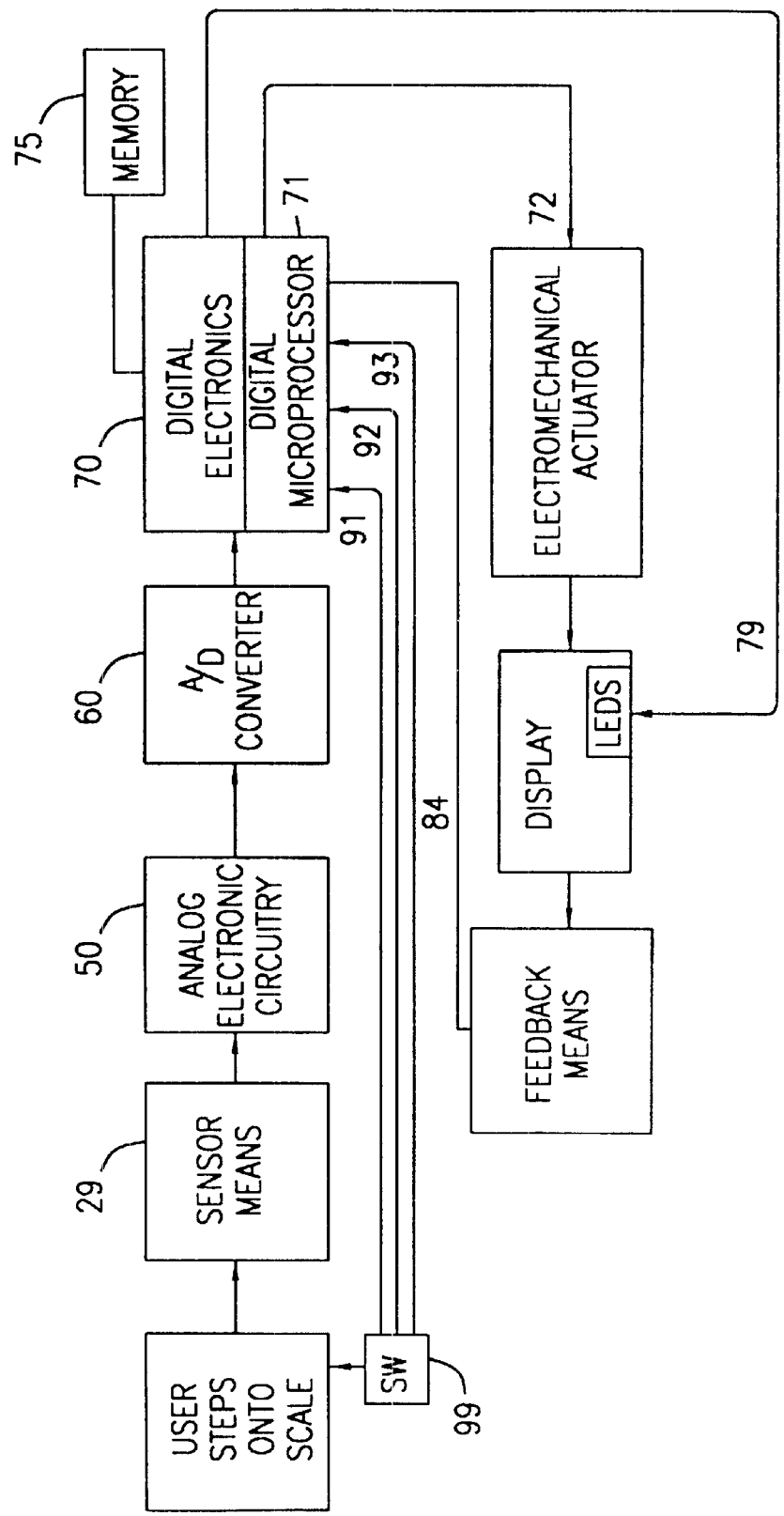
FIG. 9B is an exemplary block diagram of the major functional components of the scale apparatus associated with FIG. 9A.

In still another alternative embodiment, depicted in FIGS. 9A–9B, a digital display 99 such as an LCD display may be incorporated within dial 32 of analog display 30 to provide a user with both/either an analog and/or digital representation of a user's weight. (Note that LCD is coupled to digital circuitry module 70 via conventional conducting means within housing 10.) This may be accomplished via a user selectable switch 98 (FIG. 9B) formed on an exterior of housing 10 (see FIG. 2)and user activated to enable an individual to select either: 1) analog display only; 2) digital display only; or 3) analog and digital display. Control signals 91, 92 and 93 representing each of the above respective positions are input to digital microprocessor 70. Note that only one of the above three signals is enabled at any given time. In response to enablement of control signal 91 (analog), only digital control signal 72 will be output from digital module 70 to control actuation of the analog display. When control signal 92 is activated (digital), only digital control signal 79 will be output to drive digital display LCD 99. If control signal 93 is activated (analog and digital), both digital control signals 72 and 79 are output from digital processor 71 to activate and display both analog and digital weight results.

It is to be understood that one skilled in the art may make many variations and modifications to that described herein. For instance, it should be noted that the dial concept is not limited herein to individual dials for each place associated with a numeric such as hundreds of pounds, tens of pounds, integer pounds, fractional pounds and the like. Furthermore, the dials and associated pointers may be coaxial with concentric legends associated with each parameter or indicia. A further extension may be made to include a linear ruler-like read outs as well. Accordingly, the power and drive electronics, as well as the mechanical actuators need not be limited to a circular geometry. All such variations and modifications are intended to be included within the scope of the invention as defined in the appended claims.

I Claim:

1. A weighing apparatus for determining the weight of a person's body comprising:

a platform on which a person can stand and adapted for receiving the body of the person to be weighed;

a sensor coupled to said platform for sensing a force associated with said body and generating an analog signal indicative of the sensed force;

a digital processor including analog to digital conversion means responsive to said analog signal for outputting a digital control signal;

an actuator having an input for receiving said digital control signal for driving said actuator; and an analog display disposed on a top surface of said platform and viewable by a person standing on said platform for directly displaying body weight based on said sensed force, said analog display comprising a dial having indicia thereon, and a moveable display member driven by said actuator to a position associated with particular indicia on said dial which represents said sensed force.

2. The apparatus according to claim 1, further comprising feedback means coupled to said analog display for providing a signal indicative of a current position associated with said moveable member to said digital processor to enable control of said actuator.

3. The apparatus according to claim 2, wherein said feedback means comprises a servo coupled DC motor.

4. The apparatus according to claim 1, wherein said moveable display member comprises a first rotatable pointer for pointing to said indicia concentrically arranged on said dial corresponding to said body weight.

5. The apparatus according to claim 1, wherein said moveable display member includes a first rotatable pointer and a second rotatable pointer driven by said actuator at different rates around said dial and having first coarse and second precision indicia concentrically arranged around said dial such that the combination of said first indicia pointed to by said first pointer and said second indicia pointed to by said second pointer represent the weight of said body.

6. The apparatus according to claim 1, further comprising a digital display area on said analog display dial for providing a digital representation of said measured body weight.

7. The apparatus according to claim 1, wherein said digital processor comprises a digital microprocessor.

8. The apparatus according to claim 1, wherein said actuator comprises a stepper motor controlled by said digital processor for turning a wheel associated with said moveable display member to cause said member to point to a position on said dial corresponding to the measured body weight.

9. The apparatus according to claim 2, wherein said feedback means comprises an optical sensor for sensing a light signal indicative of the current position of the moveable member.

10. The apparatus according to claim 1, wherein said actuator comprises a DC motor for driving a gear train comprising a wheel in toothed engagement with said motor on which is mounted said display member such that the rotational speed of the motor will produce a linear movement of said movable display indicative of the measured body weight.

11. The apparatus according to claim 9, wherein said optical sensor comprises a moveable disk coupled to said moveable display member and having equidistant apertures around the periphery thereof and sandwiched between a light transmitter and a photo detector for allowing light to pass through said apertures to cause said photo detector to produce digital signals to said digital processor which are proportional to the angular position of said moveable disk.

12. An apparatus which measures the body weight of an individual, comprising:

a platform on which the individual can stand and adapted for supporting the body of the individual to be weighed;

a plurality of sensors disposed within said platform for sensing a force exerted on said platform indicative of the weight of said body and generating an analog signal proportional to said sensed force;

electronic means for combining the analog signals from said plurality of sensors to form a combined electronic signal indicative of the weight of said individual;

analog to digital conversion means for converting said electronic signal to a digital signal;

a processor for generating a digital control signal based on said electronic signal for driving an electro mechanical actuator for displaying the measured body weight on an analog display device, said display device disposed on a top surface of said platform and viewable by an individual standing on said platform, comprising a graduated dial having at least one concentrically arranged scale and a rotatable pointer, said pointer driven in rotation by said actuator according to said processor to a position on said graduated dial which directly corresponds to the measured body weight of the individual.

13. The apparatus according to claim 12, wherein said processor comprises a digital microprocessor.

14. An apparatus which measures the body weight of an individual having a switchable output display, comprising:

a platform on which the individual can stand and adapted for supporting said individual to be weighed;

sensor means disposed within said platform for sensing a force exerted on said platform indicative of the weight of said individual and generating an analog signal proportional to said sensed force;

electronic means for processing the analog signal from said sensor means to form a combined electronic signal indicative of the weight of said individual;

a user activatable switch for sending in a first mode a first control signal indicative of a request for a digital output display, and in a second mode a second control signal indicative of an analog output display, wherein said digital output display and said analog output display are both disposed on a top surface of said platform and viewable by a person standing on said platform;

a processor responsive to said first control signal for generating a first digital control signal based on said electronic signal for driving a digital display for displaying the measured body weight on said output display, and responsive to said second control signal for generating a second digital control signal for driving an electro mechanical actuator for displaying the measured body weight on said output display, said output display comprising a graduated dial having at least one concentrically arranged scale and a rotatable pointer, said pointer driven in rotation by said actuator according to said processor to a position on said graduated dial which directly corresponds to the measured body weight of the individual and a digital display means for representing said measured body weight in a digital format.

15. The apparatus according to claim 14, wherein said processor includes an analog to digital converter coupled to a digital microprocessor.

16. The apparatus according to claim 15, further comprising feedback means coupled to said output display for providing a signal indicative of a current position associated with said moveable member to said processor to enable control of said actuator.

17. A weighing apparatus for determining the weight of a person's body comprising:

a platform on which a person can stand and adapted for receiving the body of the person to be weighed;

a sensor coupled to said platform for sensing a force associated with said body and generating an analog signal indicative of the sensed force;

a digital processor including analog to digital conversion means responsive to said analog signal for outputting a digital control signal;

an actuator having an input for receiving said digital control signal for driving said actuator; and a display disposed on a top surface of said platform and viewable by a person standing on said platform for displaying body weight based on said sensed force, said display comprising an analog display having a dial with indicia thereon, and a moveable display member driven by said actuator to a position associated with particular indicia on said dial which represents a portion of the sensed force, and illumination indicators arranged at predetermined positions on said display, each associated with a particular weight unit, wherein one of said indicators having an associated weight unit closest to but not exceeding the measured body weight is illuminated in response to a signal from said processor, such that the combination of said illuminated indicators and said display member represents the measured body weight.

\* \* \* \* \*